(12) United States Patent
Braun et al.

(10) Patent No.: US 8,375,674 B2
(45) Date of Patent: Feb. 19, 2013

(54) PANEL, METHOD OF JOINING PANELS AND METHOD MANUFACTURING PANELS

(75) Inventors: Roger Braun, Willisau (CH); Martin Howald, Farnern (CH)

(73) Assignee: Flooring Technologies Ltd., Pieta (MT)

( * ) Notice: Subject to any disclaimer, the term of this patent is extended or adjusted under 35 U.S.C. 154(b) by 352 days.

(21) Appl. No.: 12/706,425

(22) Filed: Feb. 16, 2010

(65) Prior Publication Data

US 2010/0218450 A1    Sep. 2, 2010

(30) Foreign Application Priority Data

Feb. 27, 2009 (EP) .................................... 09002829

(51) Int. Cl.
*E04F 15/02* (2006.01)
(52) U.S. Cl. ..................................... 52/592.1; 52/588.1
(58) Field of Classification Search .................. 52/588.1, 52/592.1
See application file for complete search history.

(56) References Cited

U.S. PATENT DOCUMENTS

| 7,584,583 | B2 * | 9/2009 | Bergelin et al. | 52/588.1 |
| 7,603,826 | B1 * | 10/2009 | Moebus | 52/592.1 |
| 7,721,503 | B2 * | 5/2010 | Pervan et al. | 52/586.1 |
| 7,980,041 | B2 * | 7/2011 | Pervan et al. | 52/586.2 |
| 8,037,656 | B2 * | 10/2011 | Liu et al. | 52/589.1 |

(Continued)

FOREIGN PATENT DOCUMENTS

| DE | 201 16 962 | 6/2002 |
| DE | 102 24 540 | 12/2003 |

(Continued)

OTHER PUBLICATIONS

International Search Report for Corresponding Application EP 09 00 2829.

*Primary Examiner* — Robert Canfield
(74) *Attorney, Agent, or Firm* — Andrew M. Calderon; Roberts Mlotkowski Safran & Cole, P.C.

(57) ABSTRACT

A panel has a core of wood material or a wood material/plastic mixture, a top and an underside, and two opposite side edges, which have profiles that correspond to each other such that two identically configured panels can be connected and locked to one another in the horizontal (H) and vertical (V) directions by an essentially vertical joining movement. The locking in the horizontal direction (H) can be brought about by a hook connection with an upper locking section having a hook element and a lower locking section having a hook element. The locking in the vertical direction (V) can be brought about by at least one tongue element that is formed from the core in one piece and can be moved in the horizontal direction (H). The at least one tongue element provided on the lower locking section is free with respect to the core in the direction of the opposite side edge by means of an essentially vertical slot and during the joining movement snaps in behind a locking edge extending essentially in the horizontal direction (H), which locking edge is embodied on a locking projection. The tongue element is connected to the core on at least one of its two ends in the direction of its side edge (II), and the width ($B_1$, $B_2$) of the locking edge is different in size over the length (L) of the opposite side edge (I).

23 Claims, 4 Drawing Sheets

U.S. PATENT DOCUMENTS

| | | | |
|---|---|---|---|
| 8,099,924 B2 * | 1/2012 | Braun | 52/588.1 |
| 8,191,333 B2 * | 6/2012 | Braun | 52/745.19 |
| 8,191,334 B2 * | 6/2012 | Braun | 52/747.11 |
| 2003/0009971 A1 | 1/2003 | Palmberg | |
| 2008/0134607 A1 * | 6/2008 | Pervan et al. | 52/395 |
| 2008/0134613 A1 * | 6/2008 | Pervan | 52/582.2 |
| 2009/0173032 A1 * | 7/2009 | Prager et al. | 52/588.1 |
| 2010/0043333 A1 * | 2/2010 | Hannig | 52/582.2 |
| 2010/0058590 A1 * | 3/2010 | Braun et al. | 29/897.32 |
| 2010/0300029 A1 * | 12/2010 | Braun et al. | 52/588.1 |
| 2011/0094178 A1 * | 4/2011 | Braun | 52/588.1 |
| 2011/0252733 A1 * | 10/2011 | Pervan et al. | 52/309.1 |
| 2011/0258959 A1 * | 10/2011 | Braun | 52/588.1 |
| 2011/0283650 A1 * | 11/2011 | Pervan et al. | 52/588.1 |
| 2012/0042598 A1 * | 2/2012 | Vermeulen et al. | 52/588.1 |
| 2012/0073235 A1 * | 3/2012 | Hannig | 52/588.1 |
| 2012/0096801 A1 * | 4/2012 | Cappelle | 52/592.1 |

FOREIGN PATENT DOCUMENTS

| | | |
|---|---|---|
| DE | 10 2007 015 048 | 10/2008 |
| DE | 10 2007 042 840 A1 * | 3/2009 |
| EP | 1 650 375 A1 * | 10/2004 |
| EP | 1 650 375 | 4/2006 |
| EP | 1 980 683 A2 * | 4/2008 |
| FR | 2 810 060 | 12/2001 |
| WO | WO 2004/003314 | 1/2004 |
| WO | WO 2007/020088 | 2/2007 |
| WO | WO 2008/116623 | 10/2008 |
| WO | WO 2009/033623 | 3/2009 |

* cited by examiner

PANEL, METHOD OF JOINING PANELS AND METHOD MANUFACTURING PANELS

CROSS-REFERENCE TO RELATED APPLICATIONS

The present application claims priority under 35 U.S.C. §119 of European Patent Application No. 09002829.1, filed on Feb. 27, 2009, the disclosure of which is expressly incorporated by reference herein in its entirety.

BACKGROUND OF THE INVENTION

1. Field of the Invention

The invention relates to a panel, in particular a floor panel, with a core of wood material or a wood material/plastic mixture and a method of joining the floor panels and making the panels.

2. Discussion of Background Information

A panel is known, for example, from WO 2007/020088 A1. With the corresponding profile the horizontal locking and the vertical locking is achieved with elements separated from one another.

Floor panels are also known from WO 2004/003314 A1 which can be connected to one another and locked to one another by an essentially vertical joining movement. With these panels, the locking projection is formed by a vertical slot in a resilient manner and can yield in the horizontal direction during the locking operation. This type of locking is preferably provided on the transverse side of floor panels. However, it can also be provided on the longitudinal side or on the longitudinal side as well as on the transverse side.

In the case of the panel known from EP 1 650 375 A1, the tongue element is composed of plastic and is inserted in a groove running horizontally on one of the side edges and beveled on its top side. Similar to a door latch, by means of the bevel the locking element is pressed inwards into the groove by the panel to be newly set, when the underside of this panel meets the bevel and is further lowered. When the panel to be newly laid has been completely lowered to the subfloor, the tongue element snaps into a groove inserted horizontally in the opposite side edge and locks the two panels in the vertical direction. Special injection molding tools are required for the manufacture of this tongue element, so that the production is relatively expensive. Furthermore, a high-quality plastic has to be used to provide adequate strength values, which makes the tongue element even more expensive. If plastics with insufficient strength values are used, this leads to relatively large dimensions of the tongue elements, since this is the only way to ensure that corresponding forces can be produced or transferred.

The fact that the locking element is embodied as a separate component results in additional expenses. For technological reasons the production of the locking element takes place in a separate location from the panels, so that integration into the continuous production process, in particular for floor panels, is hardly possible. Because of the different materials, wood material on the one hand and plastic on the other hand, it is complex and cost-intensive to match the manufacturing tolerances from two separate production processes. Since the locking in the vertical direction would be ineffective if the locking element were missing, this element must further be secured from falling out of the groove introduced into the side edge during the further production process and during transport. This securing is also complex. As an alternative, the locking element could also be provided separately to the consumer.

The floor panels under consideration are being laid with increasing frequency by non-professionals (self-installers), so that in principle it is possible, due to a lack of experience, for the required number of locking elements to be initially miscalculated and not obtained in sufficient quantity in order to be able to lay a room completely. Furthermore, it cannot be ruled out that the self-installers make a mistake when placing the tongue element, which means that precise locking is not possible and the bond separates over time. This is then wrongly attributed by the consumer to the quality supplied by the manufacturer.

A panel is known from DE 102 24 540 A1, which is profiled on opposite side edges such that hook-shaped connection elements are formed for locking in the horizontal direction. For locking in the vertical direction, positive engagement elements spaced apart from one another horizontally and vertically are provided on the connection elements, and undercuts corresponding thereto are provided with respectively one horizontally aligned locking surface. The transverse extension of horizontally aligned locking surfaces of this type is approximately 0.05 to 1.0 mm. The dimensioning has to be very small in order for the joining of two panels to remain possible. However, this inevitably means that only low, vertically aligned forces can be absorbed, so that production must be carried out with extremely low tolerances in order to ensure that the connection does not spring open with normal stress in the case of even slight irregularities in the floor and/or soft subfloors.

A panel is described in DE 10 2007 015 048 A1 in which the locking in the vertical direction is carried out by a tongue element that is moveable in the horizontal direction. With a joining movement, the tongue element snaps in behind a locking edge extending essentially in the horizontal direction. The tongue element is formed by a horizontal and vertical cut from the core and connected to the core on at least one of its two ends. The horizontal and vertical cut render possible the spring movement of the tongue element necessary for producing the locking. However, this locking is not suitable for thinner panels with a board thickness of approximately 4 mm to 8 mm.

Based on this problem, the present invention overcomes these shortcomings and provides improvements to known panels.

SUMMARY OF THE INVENTION

A panel is characterized for solving the problem in that at least one spring element is connected to the core on at least one of its two ends in the direction of its side edge and the width of the locking edge is different in size over the length L of the opposite side edge. Through this embodiment at least two locking projections are formed which have the full width of the locking edge and a narrower locking edge is formed between the two locking projections. To change the width, the locking projection is provided in part, starting from the underside, with a chamfer running at an angle γ.

In contrast to the panel known from the published application PCT/EP 2008/007328, (PCT Pub. No. WO2009/033623), to which reference is hereby incorporated by reference herein in its entirety, the material between two locking projections is therefore not completely removed, but left in some sections at the angle γ. The profile is thereby embodied such that when two panels are joined, the locking element hooks on the lower hook element behind the fixed part of the lower locking projection and thereby improves the vertical force transmission.

The size of the angle γ is preferably between 30 and 60 degrees and in particular preferably between 45 and 55 degrees. The smallest width of the locking edge is preferably no more than 0.9 mm and in particular preferably 0.6 mm. Through the width of the vertical slot, the strength of the connection of the spring element to the core material can be determined and a limit stop in the horizontal direction can be created for the spring element so that it is safely protected from overstretching.

According to aspects of the invention, the essentially vertical slot is formed at least in part through the lower locking section. The vertical slot does not have to be embodied over the entire length as a through hole, but can be embodied as a gap, in particular, in transition regions at its ends. Essentially vertical means that the slot can run in the vertical direction or can be slightly tilted with respect to the vertical. The gap in the transition region is expediently opened towards the underside of the panel and closed towards the top of the panel. This renders possible a simple and cost-effective production, because the panel can be moved over a milling tool at a constant speed and only the penetration depth of the milling tool into the panel has to be changed. A transition region can be embodied at one or at both ends of the spring element. The gap can have a varying depth for example a steadily increasing depth.

The locking section expediently has a maximum vertical extension in the region of the hook element, so that the spring element in this region can be embodied with a correspondingly large vertical extension. With increasing vertical extension of the spring element, its rigidity also increases.

When a plurality of spring elements spaced apart from one another are provided over the length of the side edge, the stability of the connection is increased. This is because the free spring deflection in the longitudinal direction of the spring element is limited. The spacing between the individual spring elements can be selected to be larger or smaller. The smaller the spacing, naturally the greater the effective surface with which the locking is carried out, so that the transferable forces in the vertical direction are correspondingly high.

When the outer edge of the spring element is tilted at an (acute) angle, preferably at an angle between 40° and 50°, to the top, the joining movement is facilitated because the spring element with increasing movement deflects deeper in the direction of the panel core. Furthermore, the risk is reduced of the spring element being damaged during the joining movement.

The hook element on the upper locking section is preferably formed by a shoulder directed in the direction of the underside of the panel. The hook element on the lower locking section is preferably formed by a shoulder directed in the direction of the top of the panel.

The embodiment of the spring element according to the invention is particularly suitable for thin panels. Thin panels are understood to be those with a board thickness of approximately 4 mm to approximately 8 mm. Preferably a board thickness of approximately 7 mm or approximately 8 mm is selected.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

Figure 1:
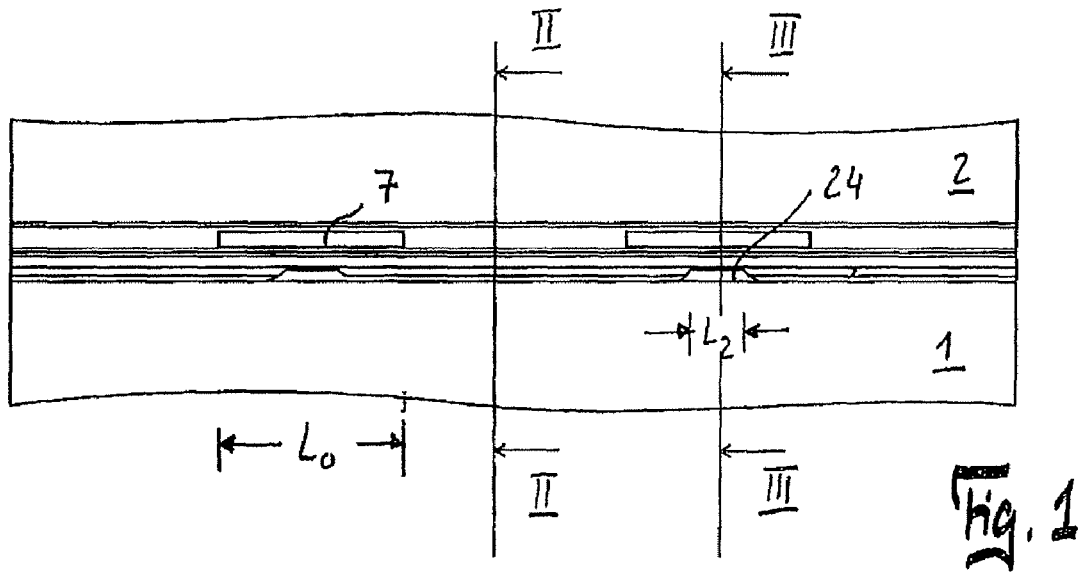
FIG. 1 shows a view from below of two panels connected to one another.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The panel of the present invention has a top and an underside and two opposite side edges, which have profiles that correspond to each other such that two identically configured panels can be connected and locked to one another in the horizontal and vertical directions by an essentially vertical joining movement. The locking in the horizontal direction can be brought about by a hook connection with an upper locking section having a hook element and a lower locking section having a hook element. The locking in the vertical direction can be brought about by at least one spring element that is formed from the core in one piece and can be moved in the horizontal direction, and the at least one spring element is free with respect to the core in the direction of the opposite side edge by an essentially vertical slot and during the joining movement snaps in behind a locking edge extending essentially in the horizontal direction. The locking edge is embodied on a locking projection.

Referring to the figures, panels 1, 2 are embodied identically. They comprise a core 3 of wood material or a wood material/plastic mixture. The panels 1, 2 are profiled on their side edges I, II lying opposite one another, wherein the side edge I was milled from the underside 4 and the side edge II was milled from the top 5.

Two spring elements 6 with a length $L_0$ are embodied on the side edge II. The spring elements 6 are identical so that one of the spring elements 6 is described below by way of example. However, it is not necessary for the spring elements 6 to be embodied identically. Instead of a plurality of spring elements 6, a single spring element extending over the full length L of the side edge II can also be provided.

The spring element 6 is produced by milling free the core 3, in that a slot 7 running essentially vertically with ends 7a, 7b is milled. The side edges I, II have a length L. In the longitudinal direction of the side edge II, the spring element 6 is connected on its ends 6a, 6b to the core material. The exposure of the spring element 6 from the core 3 is carried out exclusively through the slot 7. The outer edge 6c of the spring element 6 is tilted at an angle α with respect to the top 5 of the panel 2. The vertical surfaces of the side edges I, II are processed such that contact surfaces 8, 9 are formed in the region of the top 5.

On the side edge I lying opposite the spring element 6, the panel 1 is provided with a groove 10 extending essentially in the horizontal direction H. The groove 10 extends over the entire length L of the side edge I. The upper groove cheek 11 of the groove 10 runs essentially horizontally. It can be seen from the figures that the groove bottom 12 of the groove 10 runs essentially parallel to the outer edge 6c of the spring element 6, which facilitates the production of the groove 10. However, it could also be embodied in the vertical direction or with an angle deviating from the angle α.

The locking of the two panels 1, 2 in the horizontal direction is carried out through the hook elements 13, 14 produced by milling a step profile. The hook element 13 is part of an upper locking section 15. The hook element 14 is part of a lower locking section 16.

The hook element 13 has a shoulder 17 extending in the direction of the underside. The hook element 14 has a step-shaped shoulder 19 extending in the direction of the top with two steps 20a, 20b. The shoulder 17 has an essentially flat horizontal bearing surface 18, which interacts with an essentially flat horizontal bearing surface 22 of the hook element 14. The bearing surfaces 18, 22 form an essentially horizontal plane E, so that the panels 1, 2 connected to one another support one another.

The profiling of the hook elements 13, 14 can be selected such that a preload is produced in the joint and the vertical contact surfaces 8, 9 of the panels 1, 2 are pressed against one another such that no visible gap is produced on the top 5. In order to facilitate the joining of the panels 1, 2, the step-shaped shoulder 17 of the upper locking section 15 and the step-shaped shoulder 19 of the upper locking section 16 are chamfered or rounded on their edges.

Figure 2:
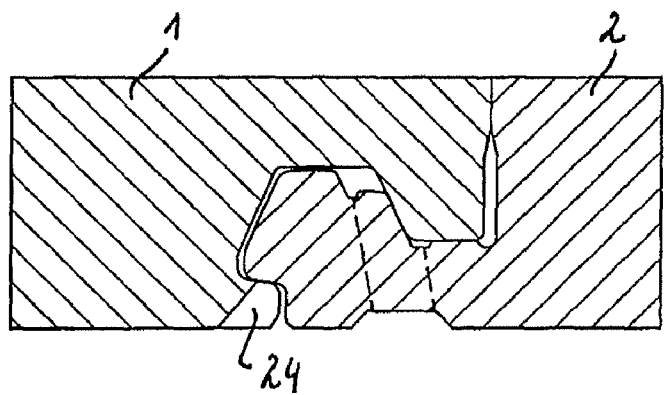
FIG. 2 shows a section along the line II-II according to FIG. 1.
Figure 3:
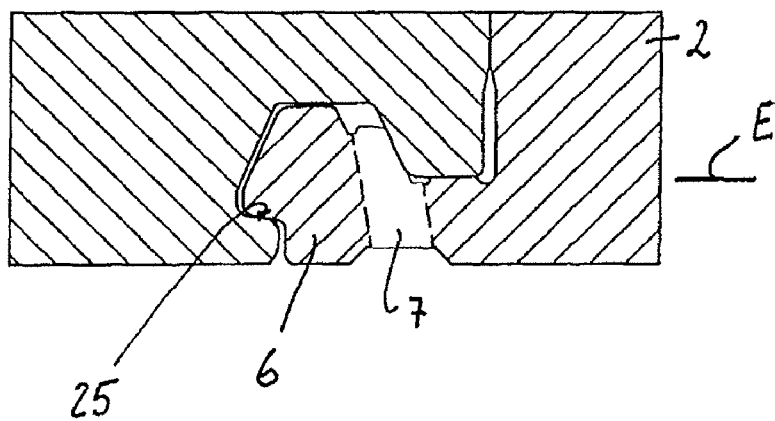
FIG. 3 shows a section along the line according to FIG. 1.
Figure 4:
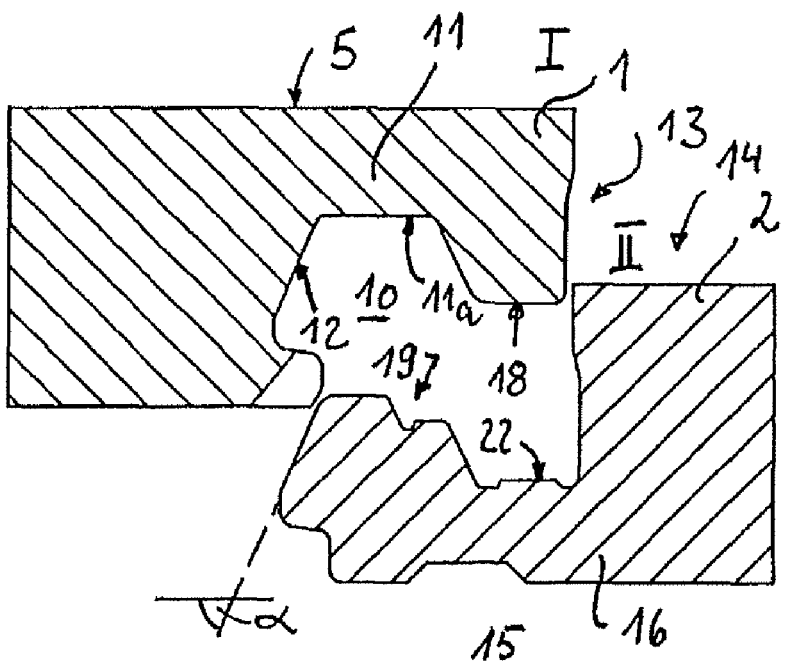
FIGS. 4-6 show two panels in partial section at three consecutive times during the joining movement.
Figure 5:
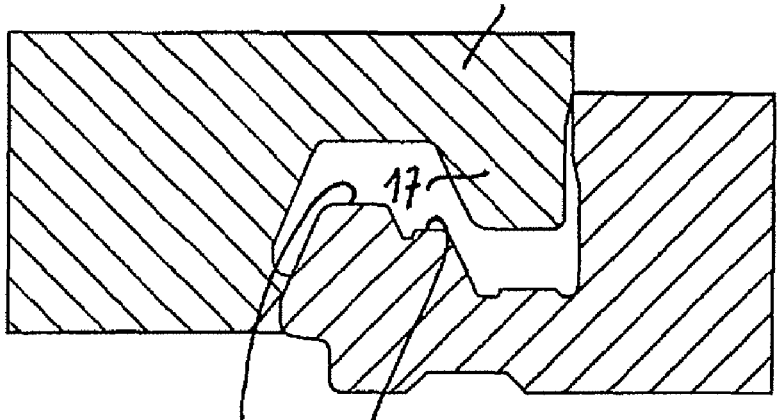
Figure 7:
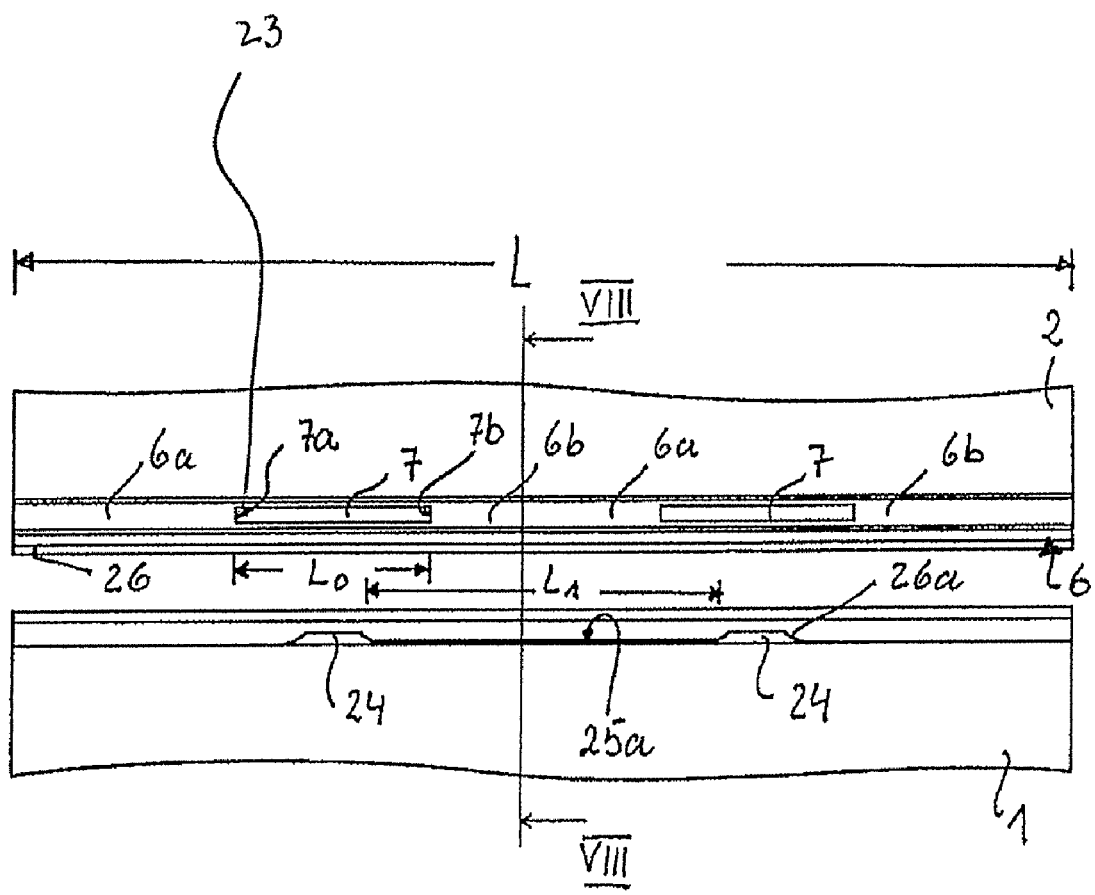
FIG. 7 shows two panels not connected to one another in a view from below.
Figure 8:
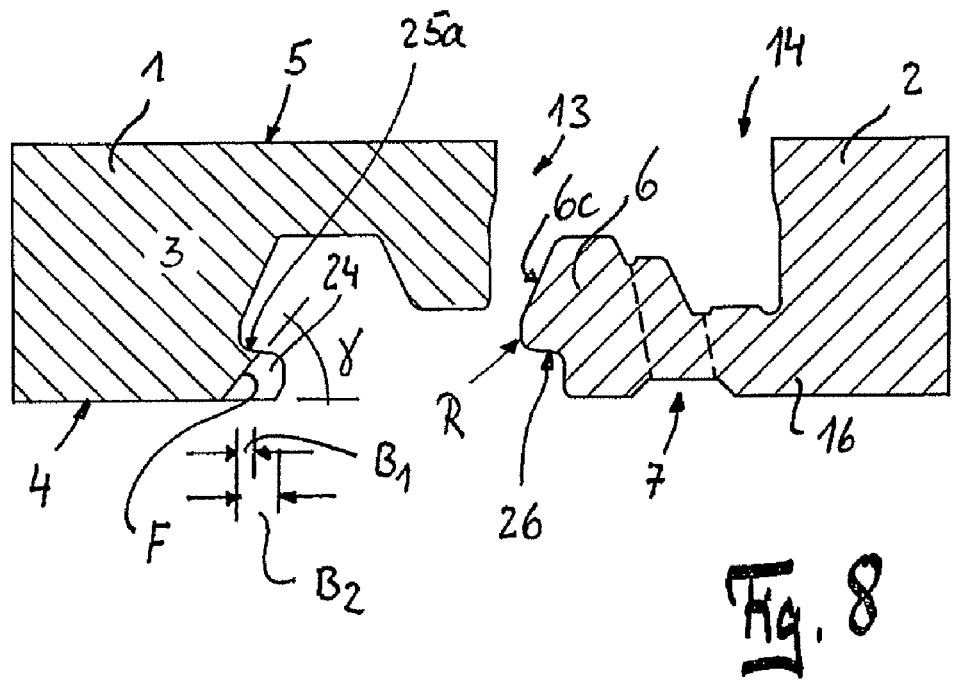
FIG. 8 shows the section along the line VIII-VIII according to FIG. 7.

FIG. 2 shows a locking projection 24 of the panel 1. The locking projection 24 is directed essentially horizontally in the direction of the panel 2. The locking projection 24 has a locking edge 25 with a width $B_2$ (FIG. 8). Between two projections 24, the locking edge 25a is embodied with a width $B_1$ (FIG. 8). The width $B_1$ of the locking edge 25a is no more than 0.9 mm. Preferably the locking edge 25a is 0.6 mm wide. The locking edge 25a is produced in that the projection 24 is milled over a certain length $L_1$ with the angle γ, which is between 30 and 60 degrees. Through the chamfer F, two projections 24 are then formed with a length $L_2$, which are spaced apart from one another and have a locking edge 25 with a width $B_2$. The length $L_2$ of the projections 24 is less than the length $L_o$ of the spring elements 6, as FIG. 3 clearly shows. The locking projection 24 is milled in its front region. The projection 24 runs essentially perpendicular in the region adjoining the locking edge 25. In plan view, each projection 24 has beveled edges 26a (FIG. 7) in order to reduce the risk of damage during the locking of the panels 1, 2.

During the joining movement, the spring element 6 is pushed horizontally in the direction of the slot 7 by abutting against the projection or projections 24. During this displacement, a tension develops in the spring element 6 due to the connection to the core 3 at the ends. The slot width is reduced thereby. This tension allows the spring element in the last section of the joining movement (FIG. 6) to snap into the groove 10, that is the spring element 6 is displaced horizontally in the direction of the groove 10. The horizontal displacement occurs as a rebound into a corresponding position under the effect of an internal tension. The slot width thereby increases again.

The groove 10 is dimensioned such that the spring element 6 can adopt its original position. The groove 10 is milled somewhat deeper into the core 3 than would be necessary to accommodate the spring element 6. This makes it easier to lay the panels 1, 2. The locking edge 25a is embodied such that during the joining of two panels 1, 2 it hooks behind the fixed part of the spring element 6 on the lower hook element 14, whereby the vertical force transfer is improved. Through the shallow angle α on the one hand the joining is facilitated, on the other hand the projection to be overcome is embodied such that the outermost edge can be slightly plastically deformed during joining. In the locked state an additional clamping effect is thereby produced. In the transition region between deflected spring element 6 and fixed locking edge 25, 25a the force necessary for locking also changes in that, through the yielding of the spring element, the locking element provided with the narrower locking edge 25a has to overcome a smaller resistance before it snaps in behind the locking edge 26.

The slot 7 has a height of approximately 60% of the board thickness. This makes it possible to use the locking according to the invention in the vertical direction even with thin panels with board thicknesses from approximately 4 mm to approximately 8 mm. The locking according to the invention in the vertical direction, however, can be used advantageously even with thicker panels, for example, with board thicknesses of approximately 12 mm.

Figure 6:
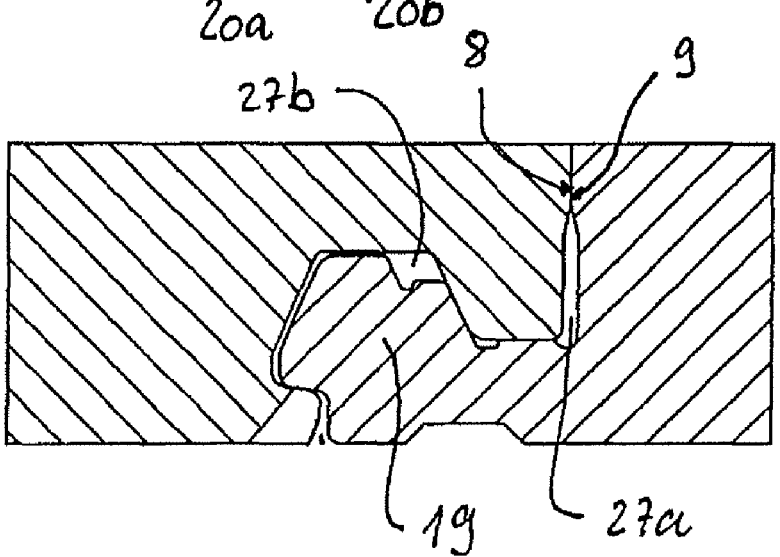

FIG. 6 shows that with the laid panels 1, 2, free spaces 27a, 27b are provided in the region of the side edges I, II. The free spaces 27a, 27b provide the freedom of movement necessary for laying and absorb any tolerances occurring from production.

The exposure of the spring element 6 by the vertical slot 7 is rendered possible by a tool that can be displaced transversely to the processing direction. The processing is preferably carried out thereby in continuous operation so that a transition region 23 is formed in each case at the beginning and at the end of the slot 7.

A milling tool, a laser tool or a water jet tool or also upright blades or internal broaches can be used as tools. In the exemplary embodiment shown in the figures, only one displaceable tool is necessary. During the processing the region not exposed, which connects the spring element 6 to the core 3 in one piece, is reduced. Even locking forces of different strength can be adjusted thereby. The locking is releasable in the exemplary embodiment in that the panels 1, 2 are displaced relative to one another along the side edges I, II or in that a release pin (not shown) is inserted laterally into the joint.

The advantages of a connection with locking edges 25, 25a of different widths to the region of the upper hook element 13 nearest to the underside 4 of the panel 1 lie in the additionally main vertical locking between the two panels 1, 2. It has been shown that with a panel 1, 2 that is 193 mm wide and 7.5 mm thick on a very soft substrate with a puntiform load of 80 kg, the height offset of 0.4 to 0.1 mm occurring near to the transverse joint could be reduced. The pull-out value in the panel plane (hook elements can spring apart less) and the durability of the connection under chair caster stress (firmer connection) were improved. The deflection line of the spring elements can be adjusted through the shape of the transition to the locking projection. A gentler transition is possible thereby.

Figure 9:
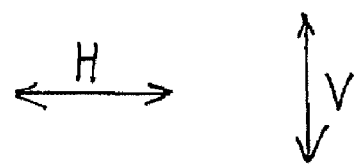
FIG. 9 shows another embodiment of panels according to the invention in a representation according to FIG. 6.
Figure 9:
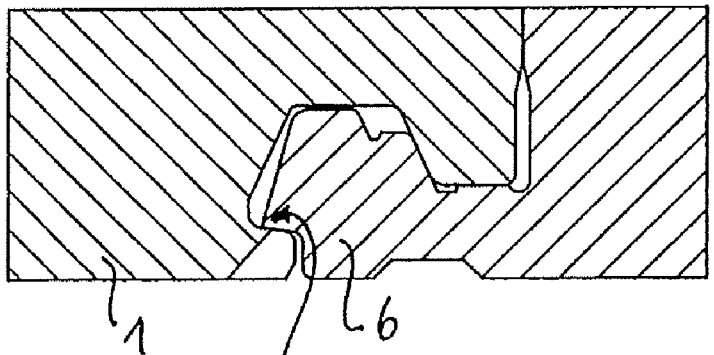
Figure 10:
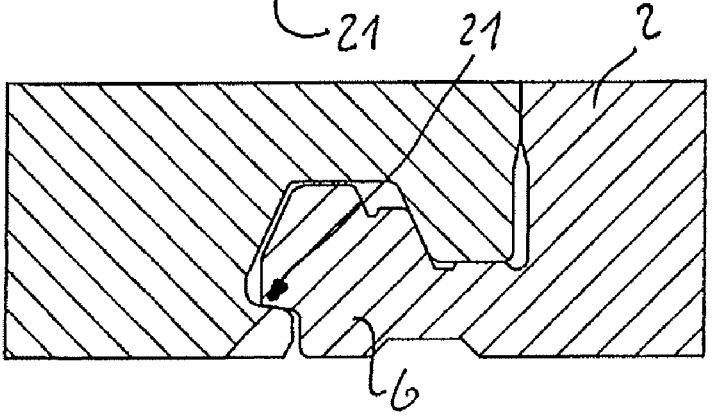
FIG. 10 shows another embodiment of panels according to the invention in a representation according to FIG. 6.

As FIGS. 9 and 10 show, the radius R on the spring element 6 (FIG. 8) can be replaced by a sharp edge 21, whereby the contact surface between the locking edge 25a and the locking edge 26 is increased or through omission of the radius R the locking force that is necessary to draw past the edge 6c on the upper edge of the chamfer F is reduced. The sharp edge 21 can merge into a perpendicular wall, which is not designated in more detail in FIG. 10, before the wall 6c of the spring element 6 is guided parallel to the groove bottom 12.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A panel, comprising
two opposite side edges, which have profiles that correspond to each other such that two identically configured panels can be connected and locked to one another in horizontal and vertical directions by an essentially vertical joining movement, wherein;
locking in the horizontal direction is provided by a hook connection with an upper locking section having a hook element and a lower locking section having a hook element,
locking in the vertical direction is provided by at least one spring element that is formed from a core in one piece and which can be moved in the horizontal direction;
the at least one spring element being provided on the lower locking section of a first side edge with an essentially vertical slot and a locking edge provided on a second side edge of the panel, opposing the first side edge, which extends essentially in the horizontal direction, and which is embodied on a locking projection, the at least one spring element, during the joining movement, snaps in behind the locking edge of an adjacent panel;
the at least one spring element being connected to the core on at least one of its two ends in the direction of its side edge, and
a width of the locking edge is different in size over a length of the second side edge.

2. The panel according to claim 1, wherein to change the width of the locking edge, the locking projection is provided in part starting from an underside with a chamfer running at an angle (γ).

3. The panel according to claim 2, wherein the size of the angle (γ) is between 30 and 60 degrees.

4. The panel according to claim 3, wherein the size of the angle (γ) is between 45 and 55 degrees.

5. The panel according to claim 1, wherein a smallest width of the locking edge is no more than 0.9 mm.

6. The panel according to claim 5, wherein the smallest width of the locking edge is no more than 0.6 mm.

7. The panel according to claim 1, wherein the essentially vertical slot is formed at least in part through the lower locking section.

8. The panel according to claim 1, wherein the at least one spring element is connected to the core of the panel on at least one of its two ends.

9. The panel according to claim 8, wherein the essentially vertical slot has transition regions at its two ends, at which the essentially vertical slot is not embodied through the lower locking section.

10. The panel according to claim 1, wherein the essentially vertical slot is embodied in a region of the hook element of the lower locking section.

11. The panel according to claim 1, wherein the at least one spring element comprising a plurality of spring elements spaced apart from one another provided over the length of the side edge.

12. The panel according to claim 1, wherein an outer edge of the at least one spring element is tilted at an angle (α) to a top.

13. The panel according to claim 1, wherein the hook element on the lower locking section is formed by a shoulder projecting in the direction of a top and the hook element on the upper locking section is formed by a shoulder directed in the direction of an underside.

14. The panel according to claim 1, wherein the panel has a board thickness of approximately 7 mm to approximately 8 mm.

15. The panel according to claim 1, wherein the slot is slightly tilted with respect to the vertical.

16. The panel according to claim 1, wherein the core is made of wood material or a wood material/plastic mixture.

17. A panel comprising: spring elements of a first side edge connected to a core on at least one of the spring elements's two ends , a locking edge of a second side edge having a width being different in size over a length of the second side edge and a slot formed between each of the spring elements and the core.

18. The panel according to claim 17, wherein an outer edge of the spring elements is tilted at an angle a with respect to a top side of the panel.

19. The panel according to claim 18, wherein vertical surfaces of the first and second side edges have vertical contact surfaces on a top side of the panel and recessed portions below the contact surfaces.

20. The panel according to claim 19, further comprising hook elements comprising part of an upper locking section and a lower locking section, wherein
the hook element of the upper locking element has a shoulder extending in a direction of the underside,
the hook element of the lower locking section has a step-shaped shoulder with two steps extending in a direction of the top,
the shoulder of the hook element of the upper locking element has an essentially flat horizontal bearing surface, which interacts with an essentially flat horizontal bearing surface of the hook element of the lower locking section,
profiling of the hook elements is structured to effect a preload produced in a joint of connected panels,
the vertical contact surfaces of the connected panels are pressed against one another such that no visible gap is produced on the top, and
the shoulder of the upper locking section and shoulder of the upper locking section are chamfered or rounded on their edges.

21. The panel according to claim 20, further comprising at least one locking projection having the locking edge, wherein:
- a length ($L_2$) of the at least one projection is less than a length ($L_0$) of the spring element,
- between two locking projections, the locking edge is embodied with a width ($B_1$), the at least one locking projection having an angle ($\gamma$), which is between 30 and 60 degrees over a length ($L_1$), and
- through chamfer, two projections are formed with a length ($L_2$), which are spaced apart from one another and have the locking edge with a width ($B_2$).

22. The panel according to claim 21, manufactured by a tool comprising a milling tool, a laser tool, a water-jet tool, upright blades or internal broaches, the tool forming the spring elements by milling free the core to form one or more slots running essentially vertically with ends, in addition to the locking edges with different widths and a groove dimensioned deeper into the core than would be necessary to accommodate the spring elements.

23. The panel according to claim 18, wherein the slot has a height of approximately 60% of board thickness.

* * * * *